United States Patent [19]

Munn

[11] Patent Number: 4,475,075
[45] Date of Patent: Oct. 2, 1984

[54] ELECTRIC POWER GENERATOR AND SYSTEM

[76] Inventor: Robert B. Munn, 4399-24th Ave., Port Huron, Mich. 48060

[21] Appl. No.: 311,392

[22] Filed: Oct. 14, 1981

[51] Int. Cl.³ .......................... H02K 7/00; B60L 7/10; F16D 63/36
[52] U.S. Cl. ........................................ 322/1; 188/156; 188/159; 310/67 R; 310/75 R; 322/90
[58] Field of Search ........................ 322/89, 90, 1, 100; 320/18, 61; 310/67 R, 67 A, 156, 75, 77; 188/156–159, 163, 71.1, 71.3, 218 XL; 180/65.5, 65.3

[56] References Cited

U.S. PATENT DOCUMENTS

| | | | |
|---|---|---|---|
| 2,511,489 | 6/1950 | Woermbke | 310/75 R |
| 3,063,002 | 11/1962 | Phelon | 322/90 |
| 3,459,980 | 8/1969 | Coroller | 310/156 X |
| 3,792,742 | 2/1974 | Mager | 188/159 X |
| 3,931,871 | 1/1976 | Martin | 188/218 XL X |
| 3,989,124 | 11/1976 | Fujii | 188/71.1 X |

Primary Examiner—R. J. Hickey
Attorney, Agent, or Firm—Barnes, Kisselle, Raisch, Choate, Whittemore & Hulbert

[57] ABSTRACT

A generator adapted to be driven by rotational forces applied to the wheel of an automotive vehicle or the like comprising a stator coupled to the vehicle frame and a rotor which includes wheel mounting structure so that the rotor is adapted to be effectively driveably coupled to the wheel. The rotor includes a cup-shaped body telescopically received over the stator coaxially with the axis of rotation, with a plurality of axially spaced circumferential arrays of magnets being mounted internally of the cup-shaped rotor body. A plurality of core assemblies are mounted on the stator in axially spaced positions corresponding to the circumferential magnet arrays. A disc brake flange projects from the rotor body and is adapted to cooperate with disc brake calipers carried by the vehicle frame for applying braking forces to the wheel.

In a charging system for the energy storage batteries of an electrically powered vehicle or the like, the batteries comprise individual low voltage batteries connected in series. Each battery of the series receives charging current through an individual associated rectifier bridge assembly from a corresponding stator core assembly of the generator structure.

2 Claims, 5 Drawing Figures

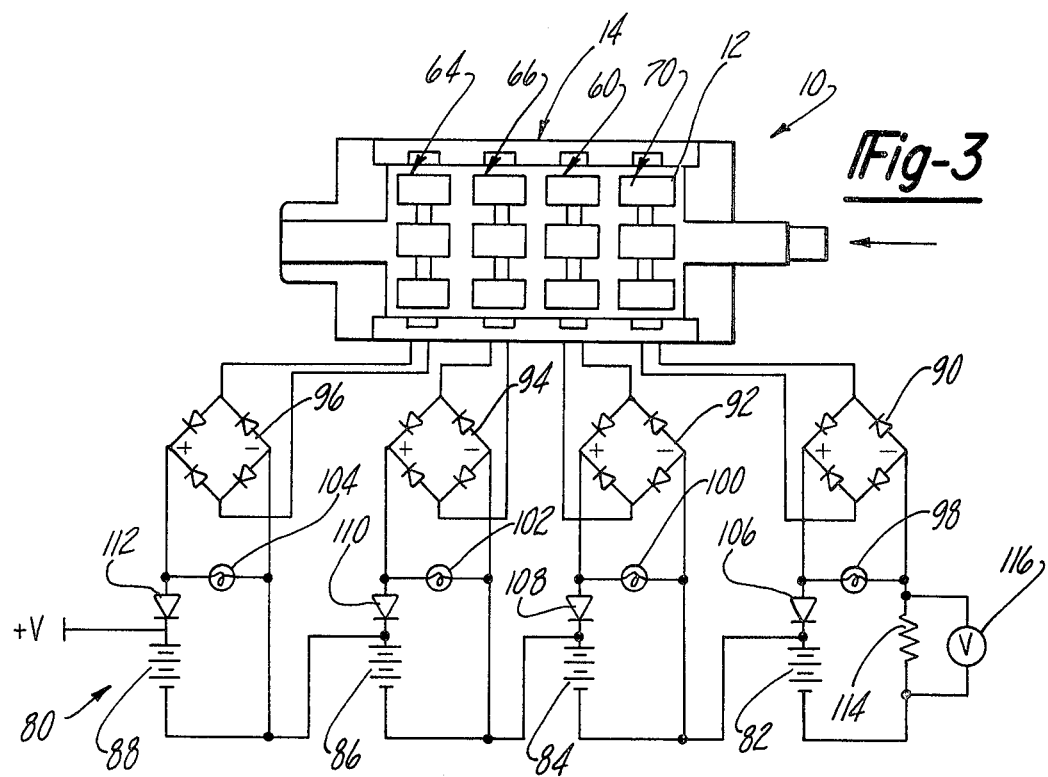
*Fig-3*
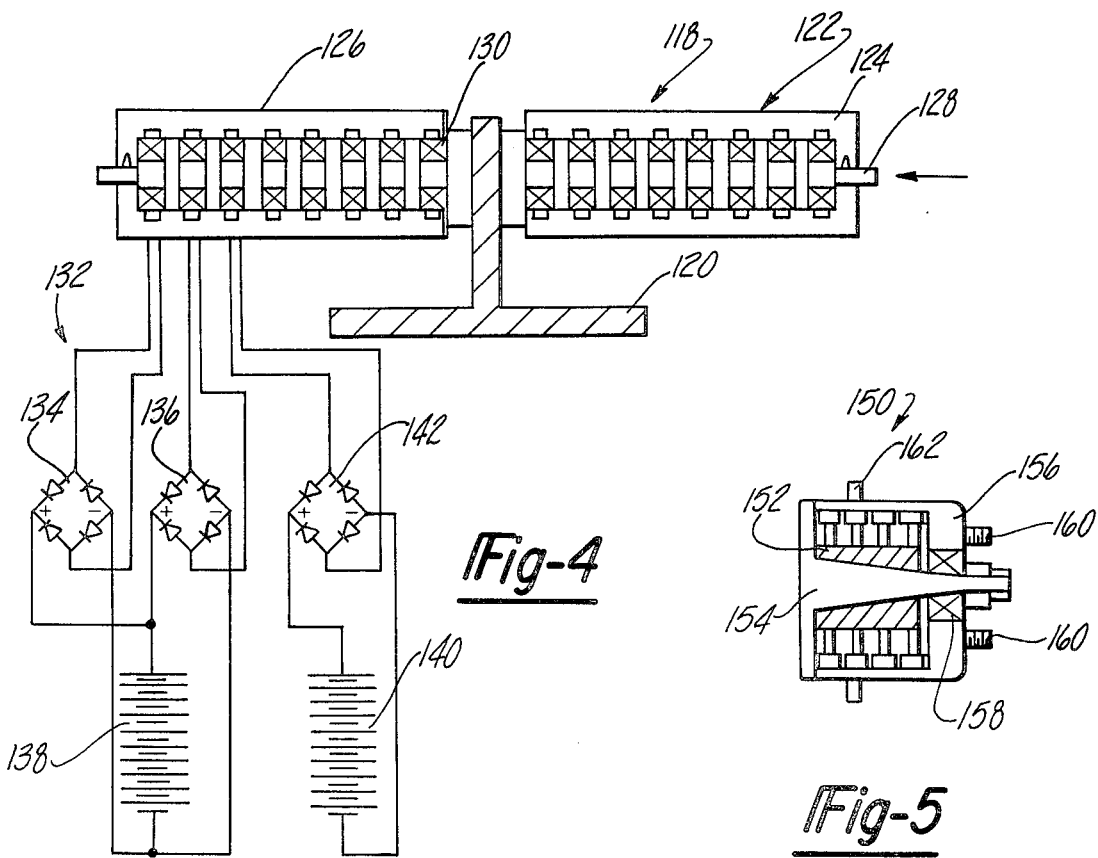
*Fig-4*
*Fig-5*

ELECTRIC POWER GENERATOR AND SYSTEM

The present invention is directed to electric power generation, and more particularly to power generators and systems which find particular application in an automotive vehicle. Yet more specifically, the invention is directed to a generator and system for charging the power batteries of an electrically powered automotive vehicle or the like.

One important object of the present invention is to provide a modular electric power generator design which may be readily expanded as required to accommodate a wide variety of generated power requirements. Yet more specifically, an object of the present invention is to provide a generator of the described type, and a power generation system employing such generator, for efficiently charging a high voltage d.c. power system of the type utilized in electric automotive vehicles and the like while maintaining a low input horsepower requirement.

A further object of the present invention is to provide an electric generator structure and system which is adapted to be employed in a wide variety of other applications such as recreational and utility vehicles, boats, windmills, etc.

Another important object of the invention is to provide an electric generator structure which has particular application in the field of automotive vehicles and which is powered by rotational forces applied to a vehicle wheel. A related and more specific object of the invention is to provide generator structure which satisfies the objectives set forth immediately above and which finds particular application on front wheel drive automotive vehicles.

The invention, together with additional objects, features and advantages thereof, will be best understood from the following description, the appended claims and the accompanying drawings in which:

FIG. 3 is a schematic diagram of an electric generator system employing the generator of FIGS. 1 and 2 for charging the batteries of an electrically powered automotive vehicle;

FIG. 4 is a schematic diagram of an alternative embodiment of the generator structure and system in accordance with the invention; and FIG. 5 is a sectioned elevational view similar to FIG. 1 showing a generator structure in accordance with the invention mounted on a non-driven stub axle.

Figure 1:
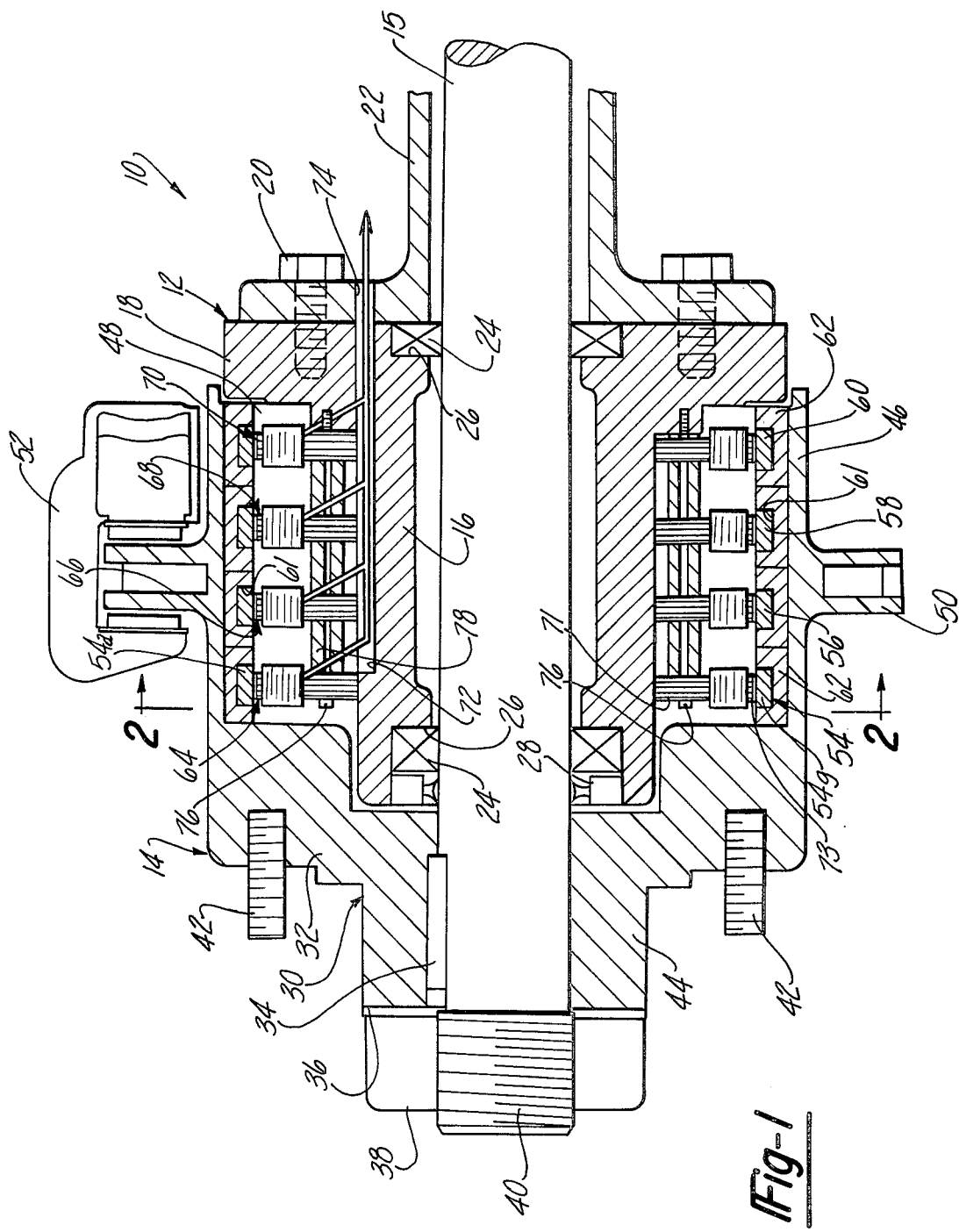
FIG. 1 is an elevational view of a presently preferred embodiment of the generator structure in accordance with the invention sectioned in a plane diametrically through the generator and drive shaft.
Figure 2:
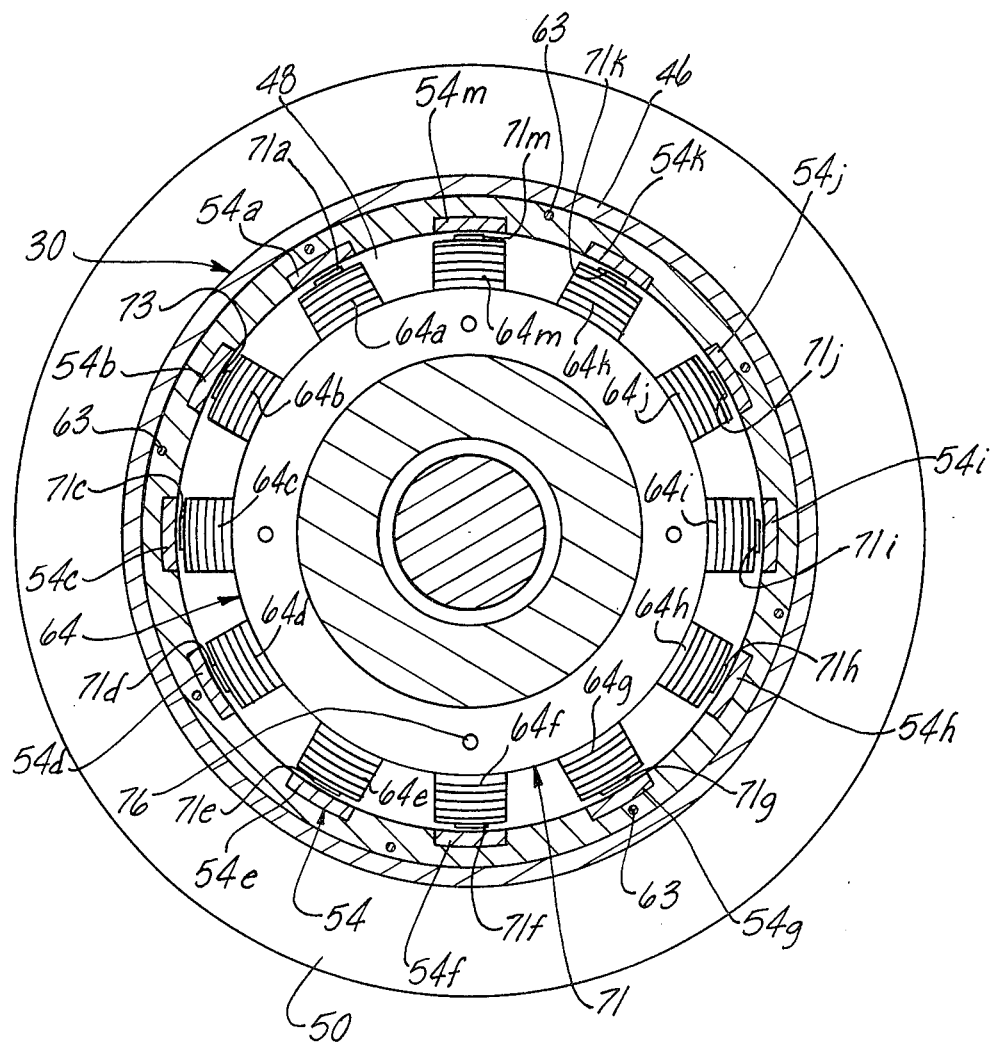
FIG. 2 is a sectional view taken along the line 2—2 in FIG. 1.

Referring to the drawings, FIGS. 1 and 2 illustrate a presently preferred embodiment 10 of the electric power generator in accordance with the invention as comprising a stator 12 adapted to be fixedly mounted to a vehicle frame and a rotor 14 driveably coupled to a wheel drive shaft or axle 15. Stator 12 includes a hollow tubular body 16 and a flange 18 radiating from one end of stator body 16. A plurality of mounting bolts 20 are received in corresponding threaded openings of stator flange 18 for mounting the stator to a vehicle frame illustrated fragmentarily at 22. Wheel drive shaft 15 is rotatably mounted coaxially within stator body 16 by roller bearings 24 press fitted into shoulders 26 at opposing stator ends. A suitable lip seal 28 is received within shoulder 26 at the frame-remote end of stator body 16 and engages drive shaft 15.

Rotor 14 comprises a generally cup-shaped body 30 driveably coupled to shaft 15 by a key 34 received in radially aligned slots in shaft 15 and rotor body 30. A washer 36 and a nut 38 are received over the threaded end 40 of shaft 15 for retaining the rotor body on the wheel drive shaft. A circumferential array of threaded studs 42 are mounted on the end wall or base 32 of rotor body 30 and project axially outwardly (with respect to the vehicle frame) at a diameter and angular spacing suitable for receiving a vehicle wheel (not shown) of selected type and configuration. A hub 44 axially projects from the wheel mounting plane defined by studs 42 on base 32 for aligning the wheel to the axis of shaft 15 in the usual manner.

Rotor body 30 further includes an integral annular wall or flange 46 extending axially inwardly from base 32 and telescopically received over stator body 16 coaxially with drive shaft 15 so as to define an annular region generally indicated at 48 between the opposing cylindrical faces or surfaces of wall 46 and stator body 16. A flange 50 integrally radiates from rotor wall 46 and is adapted to function as a disc brake rotor in cooperation with conventional brake caliper structure 52 mounted to the vehicle frame (by means not shown) for applying braking forces to a wheel mounted on rotor 14.

Internally of rotor wall 46 within region 48, a plurality of permanent magnets are mounted in axially spaced circumferential arrays 54, 56, 58 and 60. Each array 54–60 includes a plurality of circumferentially spaced individual magnets, one such array being illustrated at 54a–54m in FIG. 2 and the remainder being identical thereto. Each magnet 54a–54m of array 54 is mounted in subassembly within a corresponding arcuate pocket 61 of an annular insert 62. The several inserts 62 carrying respective magnet arrays 54–60 are fixedly mounted within rotor wall 46 by screws 63 (FIG. 2) with the individual magnets facing radially inwardly as previously described on a common cylinder of revolution coaxial with the axis of shaft 15. The magnets are constructed of suitable material and are alternately polarized in the radial direction.

A plurality of stator core assemblies 64, 66, 68, 70 are fixedly carried on stator 12 at axially spaced positions corresponding respectively to the positions of magnet arrays 54, 56, 58 and 60 carried by rotor 14. Stator core assembly 64 (FIGS. 1 and 2) includes an annular core 71 constructed of ferromagnetic sheet stock laminated or stacked in a direction axially of drive shaft 15 and having a number of poles 71a–71m (FIG. 2) radiating therefrom. Poles 71a–71m terminate within open region 48 on a common cylinder of revolution in radial proximity to magnet arrays 54 and separated therefrom by an air gap 73.

An electrical coil 64a–64m is mounted on each corresponding pole 71a–71m of stator core 71. Each coil 64a–64m comprises a selected number of turns of insulated wire, all coils being identically wound in the same direction relative to the operator axis. Coils 64a–64m are connected in series. Stator core assemblies 66–70 are identical to assembly 64 which has been described in detail. Stator core assemblies 64–70 and magnet arrays 54–60 may be purchased as subassemblies from the Prestolite Electrical Div. of Eltra Corp. in West Springfield, Mass.

The several core assemblies 64–70 are mounted in fixed position by a circumferential array of screws 76 extending through the core structures and threadably received into stator flange 18. The several stator core assemblies are separated from each other by the sleeves or spacers 78 of non-magnetic material encompassing screws 76. A pair of leads from each core assembly 64–70 is fed through an axial groove 72 (FIG. 1) formed in the outer surface of stator body 16, and through an opening 74 in vehicle frame 22, for individual connection of each stator core assembly to power utilization circuitry such as the battery charging circuit to be described in connection with FIG. 3.

FIG. 3 illustrates the generator 10 in accordance with FIGS. 1 and 2 in one presently preferred application thereof for charging the high voltage d.c. energy storage battery system of an electrically powered automotive vehicle. Specifically, in accordance with an important aspect of the generator system of the invention, the energy storage system 80 comprises a plurality of individual batteries 82, 84, 86, 88 connected by corresponding diode bridge rectifiers 90, 92, 94, 96 to receive charging current from the series-connected coils of stator core assemblies 70, 68, 66 and 64 respectively. Thus, the several series-connected batteries 82–88 supply a composite voltage +V to the external utilization circuit, such as the drive motors of an electric vehicle. The individual stator assemblies 64–70, however, need only supply a relatively low output voltage to corresponding individual battery of the series. This permits the individual stator assemblies to provide relatively high charging current to each battery, so that the overall power output of generator 10 is relatively high for any given input power available.

A lamp 98, 100, 102 and 104 is connected across the output of each diode rectifier 90–96 for indicating the application of charging power to the associated battery 82–88 and is effectively isolated from the associated battery by a corresponding blocking diode 106, 108, 110 and 112. A resistor 114 is connected in series between rectifier bridge 90 and battery 82, and a voltmeter 116 is connected across resistor 114 for indicating the level of charging current to battery 82. It will be appreciated that the combination of resistor 114 and meter 116 could as well be placed in any other charging circuit. Lamps 98–104 are optional for signalling or showing that each segment is operating.

FIG. 4 illustrates a modified generator 118 which includes a platform stand 120 suitable for mounting the generator at any convenient location. Rotor 122 comprises a pair of axially opposed cup-shaped bodies 124, 126 each keyed to a shaft 128 extending entirely through generator 118 and adapted to receive motive power from an external source (not shown). Each cup-shaped body 124, 126 includes a multiplicity of axially spaced circumferential magnet arrays. Likewise, the generator 118 comprises a stator assembly 130 mounted to platform 120 and comprising a plurality of axially spaced stator core assemblies in correspondence with the magnet arrays on rotor 122. The structure of the individual magnet arrays and stator core assemblies are identical to those illustrated in FIG. 2. FIG. 4 also illustrates a modified battery charging arrangement 132 in accordance with the invention wherein two stator core assemblies are connected in parallel through associated rectifier bridge assemblies 134, 136 to a single battery 138 so as to apply in effect double charging current to the battery. A second battery 140 receives charging current from a single stator core assembly through the rectifier bridge assembly 142 as previously described.

FIG. 5 illustrates a modification to the generator of FIG. 1 which is particularly adapted for use in connection with non-driven wheel units of an automotive vehicle. In particular, the generator 150 of FIG. 5 comprises a stator 152 fixedly mounted on a typical stub axle or spindle 154 and a rotor 156 mounted by bearings 158 to spindle 154. Rotor 156 includes wheel mounting studs 160 and a disc brake rotor flange 162 as previously described.

Thus, in accordance with one important aspect of the present invention, there has been provided a modular generator structure which may be readily expanded as required to accommodate any number of individual loads and/or overall voltage requirements. In particular, it will be appreciated with reference to FIG. 4 that the generator of the invention may be expanded almost indefinitely by addition of additional stator core assemblies and rotor magnet arrays.

Specific presently preferred embodiments of the generator structure in accordance with the invention have been disclosed with particular application to automotive vehicles. That is, one presently preferred embodiment of the generator structure is illustrated in FIGS. 1 and 2 with particular application to the front or driven wheels of a front wheel drive vehicle, and a second generator structure is illustrated in FIG. 5 having particular application to the rear or non-driven wheels of a front wheel drive vehicle. It will be appreciated, however, that the generator structure of the invention in its broadest aspects is not limited to automotive vehicle applications. Indeed, the generator 118 of FIG. 4, for example, could as well receive input rotational power from a suitable source on a recreational vehicle such as a boat, or from a windmill or the like.

In accordance with a second important aspect of the present invention, a generator charging system has been described, particularly in connection with FIGS. 3 and 4, wherein the individual stator core assemblies are connected by corresponding rectifier units to electrical loads such as energy storage batteries. The modular or segmented stator and rotor structure so connected in accordance with the invention provides a relatively high current output to input horsepower ratio.

The invention claimed is:

1. An electric power generator for automotive vehicles and like applications comprising
   a stator including a plurality of magnetic core means each having a circumferential array of radially outwardly directed poles, a hollow tubular body with said plurality of core means being mounted externally of said body in fixed axially spaced positions to a vehicle frame with magnetic insulation means being disposed between said axially spaced core means, and a stator coil on each of said radially outwardly directed poles,
   a hollow cup-shaped rotor having a base adapted to be mounted for rotation relative to the vehicle frame and stator and an annular wall coaxially and telescopically received over said stator, and a plurality of circumferential permanent magnet arrays equal in number to said core means and mounted in axially spaced positions internally of said annular wall such that each said circumferential permanent magnet array is aligned radially with a corresponding said core means, means including threaded studs on said base for removably mounting a vehicle wheel thereto, and
bearing means within said body for receiving a wheel drive shaft and means for coupling said wheel drive shaft to said rotor base.

2. The generator set forth in claim 1 wherein said rotor means further comprises a flange projecting from an external surface of said annular wall and adapted to cooperate with disc brake caliper means mounted to said vehicle frame for applying braking forces to a wheel mounted on said rotor.

* * * * *